UNITED STATES PATENT OFFICE.

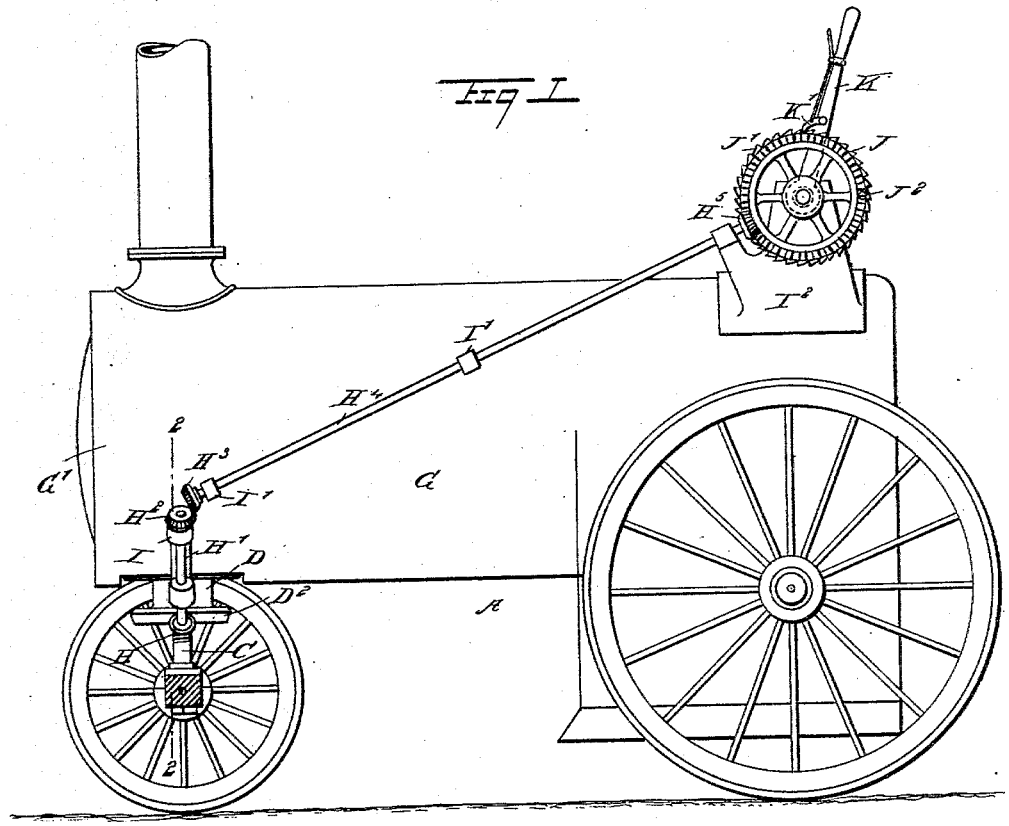

WILLIE C. HANCOCK, OF ALBANY, KENTUCKY.

LEVELING-MACHINE.

SPECIFICATION forming part of Letters Patent No. 545,287, dated August 27, 1895.

Application filed May 14, 1895. Serial No. 549,311. (No model.)

*To all whom it may concern:*

Be it known that I, WILLIE C. HANCOCK, of Albany, in the county of Clinton and State of Kentucky, have invented a new and Improved Leveling-Machine, of which the following is a full, clear, and exact description.

The invention relates to traction-engines, portable boilers, and like machines; and its object is to provide a new and improved leveling device to permit of conveniently setting the boiler in a horizontal position in case it stands on uneven ground or travels up or down a hill.

The invention consists of a fixed screw-rod and a block having a nut and pivoted on the boiler.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in both the figures.

Figure 1 is a side elevation of the improvement as applied and with the front axle in section, and Fig. 2 is a transverse section of the same on the line 2 2 of Fig. 1.

The traction-engine or other machine A, of any approved construction, is provided at its front axle B with an upwardly-extending screw-rod C, firmly fastened to the axle by suitable means. On this screw-rod C screws a revoluble nut D, seated in the under side of a block E and held in place therein by set-screws F screwing in the block and engaging with their inner ends an annular recess D', formed on the upper part of the nut D.

The block E is provided on its sides with trunnions E', journaled in suitable bearings $G^2$, formed in the smoke-box G' of the boiler G, as is plainly indicated in Fig. 2. The screw-rod C extends through the top of the block E into a tubular extension $E^2$, secured to the top of the block, so as to protect the said screw-rod from soot and other impurities.

On the lower end of the nut D is secured or formed a beveled gear-wheel $D^2$ in mesh with a pinion H, attached to a shaft H', extending upwardly and at one side of the boiler, the said shaft being journaled in suitable bearings I, secured to the side of the boiler G. On the upper end of the shaft H' is secured a beveled gear-wheel $H^2$ in mesh with a beveled gear-wheel $H^3$, secured on a shaft $H^4$, journaled in bearings I' and $I^2$ and extending upwardly and rearwardly on one side of the boiler, as shown in Fig. 1.

The upper end of the shaft $H^4$ is provided with a beveled gear-wheel $H^5$ in mesh with a larger wheel J, journaled on the bearing $I^2$ and provided with ratchet-teeth J', engaged by a pawl K', held on a lever K under the control of the operator and fulcrumed loosely on the shaft of the gear-wheel J. Now, it will be seen that by the operator manipulating the lever K a rotary motion can be given to the gear-wheel J to rotate the beveled gear-wheel $H^5$, shaft $H^4$, and the shaft H' by the gear-wheels $H^2$ and $H^3$. The rotary motion of the shaft H' is transmitted by the pinion H to the beveled gear-wheel $D^2$ to revolve the nut D on the screw-rod C, thus causing the nut to move upward on the said screw-rod to raise the front end of the boiler whenever it is required to do so.

When it is desired to lower the front end of the boiler, the pawl K' is disengaged from the ratchet-wheel J' and the gear-wheel J is turned by the operator taking hold of a handle $J^2$ on the said gear-wheel J. It is understood that in lowering the front end of the boiler G the weight of the latter on the block E and nut D assists in rotating the nut D, and consequently comparatively little power is necessary for turning the gear-wheel J than when raising the front end of the said boiler.

Having thus fully described my invention, I claim as new and desire to secure by Letters Patent—

1. The combination with an axle and a boiler, of a screw rod rigid on the axle and projecting upwardly into the boiler, a tubular casing arranged within the boiler and receiving the screw rod, a block secured to the boiler and directly below the tubular casing, a nut pivotally connected to the block and operating on the screw rod, and means for revolving the nut, substantially as described.

2. The combination with an axle and the parts supported thereby, of a rigid screw rod carried by the axle, a block pivotally connected to the parts supported by the axle, a nut fitting within the block and having an annular groove therein, a set screw carried by the block and projecting into the groove of the nut, and means for revolving the nut, substantially as described.

3. The combination, with an axle and a boiler carried thereby, of a threaded rod rigid on the axle, a block connected to the boiler, a nut rotatively mounted in the block and operated with the rod, a diagonally disposed shaft having bearings on the outside of the boiler and geared with the nut, and means for revolving said shaft, substantially as described.

4. The combination with an axle and a supported part of a rigid screw rod, a nut operating thereon and having an annular groove, a block receiving the nut and revolubly holding the same, a set screw passing through the block and into the groove of the nut, and means for operating the nut, substantially as described.

WILLIE C. HANCOCK.

Witnesses:
ELZA BERTRAM,
IRA WYNN.